United States Patent
Ledford et al.

(10) Patent No.: US 6,800,581 B2
(45) Date of Patent: Oct. 5, 2004

(54) CATALYST COMPOSITION FOR POLYMERIZATION OF OLEFINS AND PROCESS USING THE COMPOSITION

(75) Inventors: John Ledford, Riyadh (SA); Mansour I. Taftaf, Riyadh (SA); Syriac Palackal, Riyadh (SA); Atieh Abu Raqabah, Riyadh (SA); Akhlaq A. Moman, Riyadh (SA); Orass M. Hamed, Riyadh (SA); Navin Nallaveerapan, Riyadh (SA)

(73) Assignee: Sabic Basic Industries Corporation, Riyadh (SA)

( * ) Notice: Subject to any disclaimer, the term of this patent is extended or adjusted under 35 U.S.C. 154(b) by 36 days.

(21) Appl. No.: 10/232,461

(22) Filed: Aug. 30, 2002

(65) Prior Publication Data

US 2003/0073569 A1 Apr. 17, 2003

(30) Foreign Application Priority Data

Sep. 3, 2001  (EP) ............................................. 01120673

(51) Int. Cl.$^7$ ........................... B01J 31/00; B01J 37/00; C02F 4/02; C02F 4/60
(52) U.S. Cl. ........................... 502/103; 525/50; 428/407
(58) Field of Search .......................... 502/103; 525/50; 428/407

(56) References Cited

U.S. PATENT DOCUMENTS

| | | |
|---|---|---|
| 4,810,774 A | 3/1989 | Drent |
| 4,900,706 A | 2/1990 | Sasaki et al. |
| 5,118,648 A | 6/1992 | Furtek et al. |
| 5,412,070 A | 5/1995 | Hanna et al. |
| 5,654,487 A | 8/1997 | Cooley et al. |
| 5,952,456 A | 9/1999 | Bradford et al. |
| 5,955,562 A | 9/1999 | Ash et al. |
| 6,124,412 A * | 9/2000 | Bin-Taleb et al. ........... 526/159 |
| 6,184,428 B1 * | 2/2001 | Zahoor et al. ............... 585/523 |
| 6,235,678 B1 * | 5/2001 | Mamedov et al. ........... 502/354 |
| 6,284,868 B1 * | 9/2001 | Geprags et al. ............. 528/392 |

OTHER PUBLICATIONS

Blackwell, et al. "Exploiting Site–Site Interactions on Solid Support to Generate Dimeric Molecules" Organic Letters (2001), vol. 3, No. 8, 1185–1188.*

* cited by examiner

Primary Examiner—Mark L. Bell
Assistant Examiner—Jennine Brown
(74) Attorney, Agent, or Firm—Kramer Levin Naftalis & Frankel LLP

(57) ABSTRACT

The present invention relates to a catalyst composition for homopolymerization or copolymerization of olefins comprising: (a) a solid catalyst precursor comprising a transition metal compound of group IVB, VB, or VIB of the periodic table, a magnesium compound and aliphatic polyketone particles; and (b) a cocatalyst comprising an aluminum alkyl, an aluminoxane or mixtures thereof; and a process for homopolymerisation or copolymerisation of olefins.

20 Claims, No Drawings

CATALYST COMPOSITION FOR POLYMERIZATION OF OLEFINS AND PROCESS USING THE COMPOSITION

The present invention relates to a catalyst composition for homopolymerization or copolymerization of olefins.

Ziegler-Natta catalysis for the polymerization of olefins is a widely known catalytic process. A typical Ziegler-Natta catalyst comprises a transition metal compound and a cocatalyst. The transition metal compound may be supported on a support. Supports suitable in A Ziegler-Natta catalysis are known from the prior art to be common refractory oxide supports, such as silica. However, polymeric supports have been developed in recent years. A number of patents claim the use of polymers as supports for polymerization catalysts. U.S. Pat. No. 4,900,706 discloses that polymer supports may be impregnated with titanium, magnesium and chlorine as a component for a catalyst for olefin polymerization wherein copolymers of olefins and styrene are the preferred polymer supports. U.S. Pat. No. 5,118,648 discloses the use of porous polymer supports, with the preferred embodiment comprising divinyl benzene cross-linked polystyrene.

Further, U.S. Pat. No. 5,412,070 discloses that terpolymers of ethylene, propylene and carbon monoxide (aliphatic polyketone) may be effectively employed as a support for a palladium-based catalyst system. In U.S. Pat. No. 5,952,456 it is similarly suggested to use polyketone as a support for the preparation of aliphatic polyketones, but specifically it is disclosed that when an aluminoxane is used it may be attractive to employ commercially available supported aluminoxane, for example methyl aluminoxane on silica.

Anyone skilled in the art is aware of the broad range of electron donors, including ethers, used in association with Ziegler-Natta-catalysts. Consequently, the widest possible chemical resistance available is advantageous in selecting a polymer support material. Polymeric supports also have the advantage of short, low temperature drying steps and reportedly higher tolerance to water and oxygen impurities compared to traditionally used refractory oxide supported catalysts.

However, the polymer supports disclosed in the prior art typically suffer some weaknesses that decrease their utility in this particular application. Compared to oxide supported catalysts the polymer supports known are much more expensive.

It is therefore an object of the present invention to provide a catalyst composition for polymerization of olefins comprising a polymer support which overcomes the drawbacks of the prior art.

Further, it is an object of the present invention to provide a process for homopolymerization or copolymerization of olefins wherein such a catalyst composition may be utilized.

The object regarding the catalyst composition is solved by a catalyst composition for homopolymerization or copolymerization of olefins comprising:
(a) a solid catalyst precursor comprising a transition metal compound of group IVB, VB, or VIB of the periodic table, a magnesium compound and aliphatic polyketone particles; and
(b) a cocatalyst comprising an aluminum alkyl, an aluminoxane or mixtures thereof.

Surprisingly, it was found that aliphatic polyketone may be excellently used as a polymeric support in the field of Ziegler-Natta-catalysis. Aliphatic polyketone has a high melting point, good chemical resistance and mechanical strength.

Further, it is non-friable, insensitive to common solvents and tolerant to typical catalyst components. In preparation of such an aliphatic polyketone support the dehydration step is relatively short and may be carried out at comparatively lower temperatures.

The high melting point, chemical resistance and strength of aliphatic polyketones offer the opportunity to realistically compete with silica as a support. Typical aliphatic polyketones melt at over 210° C. with a high level of ductility and resistance to common organic solvents.

Aliphatic polyketones allow for reaction of the polymer with reducing agents and presumably with Grignard reagents to afford a low-chlorine, magnesiumalkoxide supported catalyst. Therefore, one further advantage is the lack of chlorine in the aliphatie polyketone.

With regard to the reaction of aliphatic polyketones with reducing agents these aliphatic polyketones have to be differentiated from the widely know aromatic polyketones. Typical aromatic polyketones have virtually inaccessible ketone sites, which make them very poor candidates for a reaction with Grignard reagents. The bulk of the polymer backbone of the aromatic polyketones makes them unlikely candidates for surface modification. Further, aromatic polyketones generally have very high melting temperatures.

The use of aliphatic polyketone as a support in the catalyst composition according to the present invention has the following advantages:
reduced chlorine content relative to traditional chlorinated supported catalysts, such as polyvinylchloride;
low potential toxicity;
an electron donor is "built in" in an unreacted, accessible ketone site;
high solvent resistance;
reactivity of aliphatic ketone sites to reducing and alkylating agents (such as hydrates, aluminum alkyls and Grignard reagents);
secondary and tertiary alkoxides which have been claimed to enhance activity, bulk density, etc. may be "built in" from the support;
high temperature resistance of aliphatic polyketones that can allow for higher preparation temperatures;
good aluminum alkyl compatibility;
higher chemical and thermal stability during processing relative to "standard polymers".

In summary, using aliphatic polyketone as a support for the catalyst composition of the present invention offers a unique blend of the properties of silica and polymer supports known in the prior art.

Preferably, the polymer particles of the aliphatic polyketone have a mean particle diameter of about 5 to about 10,000 $\mu$m, preferably about 15 to 500 $\mu$m, a pore volume of at least about 0.1 cm$^3$/g, a pore diameter of at least about 500 to 10,000 Angstrom and a surface area of from about 0.2 m$^2$/g to about 50 m$^2$/g, and are, most preferably, regularly shaped.

Aliphatic polyketone suitable as a support for the catalyst composition of the present invention may have a molecular weight in the range of about 3,000 to about 300,000 g/mole.

The polymer particles used in the present invention have labile aliphatic ketone groups as surface active sites. Preferably, these active sites are reacted stoichiometrically with the organo-metallic compound.

Aliphatic polyketone particles offer significant advantages over traditional olefin polymerization catalysts using supports such as silica or magnesium chloride. In contrast to the silica supported catalyst, the polymer particles described in the present invention require substantially milder conditions for dehydration. Their chemical resistance to solvents is unique among most other polymer supports. The stability of the aliphatic polyketone polymer adds significant flexibility to catalyst preparation conditions in terms of solvents and temperature. The polyketone polymer used in the present invention is also commercially available at a significant cost savings compared to silica or magnesium chloride supports. Besides the lower cost of the polymer, the catalyst benefits from very low metal loadings, both of which decrease the final catalyst cost and diminish the ash in the final product. Also, the catalyst in the present invention is more active than conventional silica or magnesium chloride supported Ziegler-Natta catalysts and some supported metallocene catalysts.

Further, the catalyst composition of the present invention may comprise an electron donor which may be oxygenated organic material, such as diethers, diesters, alkyl carbonates and the like, or aryl or alkyl chlorides, such as monochlorbenzene, or mixtures thereof. The most preferred electron donor is ethylbenzoate The transition metal compound may be represented by the general formula $M(OR^1)_n X_{4-n}$ wherein M represents a transition metal of group IVB, VB or VIB of the periodic table, $R^1$ represents an alkyl group, aryl group or cycloalkyl group having 1 to 20 carbon atoms, X represents a halogen atom and $0 \leq n \leq 4$.

Non-limiting examples of the transition metal are titanium, vanadium, or zirconium, examples of $R^1$ include alkyl groups such as methyl, ethyl, n-propyl, isopropyl, n-butyl and the like.

Preferable examples of the above-mentioned transition metal compounds include the following: titaniumtetrachloride, methoxytitaniumtrichloride, dimethoxytitaniumdichloride, ethoxytitaniumtrichloride, diethoxytitaniumdichloride, propoxytitaniumtrichloride, dipropoxytitaniumdichloride, butoxytitaniumtrichloride, dibutoxytitaniumdichloride, vanadiumtrichloride, vandiumtetrachloride, vanadiumoxytrichloride and zirconiumtetrachloride.

The magnesium compound used in the catalyst composition of the present invention may be represented by the general formula $R^2MgX$, wherein $R^2$ is an alkyl group having 1 to 20 carbon atoms, and X is a halogen atom, preferably chlorine. Other preferable magnesium compounds are represented by the general formula $R^3R^4$ Mg, wherein $R^3$ and $R^4$ are different or the same alkyl groups having 1 to 20 carbon atoms.

Preferable examples of the above-mentioned magnesium compounds include the following: dialkylmagnesium, such as diethylmagnesium, dipropylmagnesium, di-isopropylmagnesium, di-n-butylmagnesium, di-isobutylmagnesium, butylethylmagnesium, dihexylmagnesium, dioctylmagnesium, butyloctylmagnesium, alkylmagnesium chloride, such as ethylmagnesium chloride, butylmagnesium chloride, hexylmagnesium chloride or mixtures thereof.

Activators for the titanium sites may be represented by the general formula $R^6_n AlX_{3-n}$ or $R^7 R^8—Al—O—AlR^9_2$, wherein $R^6$, $R^7$, $R^8$ and $R^9$ each represent a hydrocarbon group having 1 to 10 carbon atoms; X represents a halogen atom or an alkoxy group and $0=n=3$. Illustrative but not limiting examples include trialkylaluminums such as trimethylaluminum, triethylaluminum, triisobutylaluminium, tri-n-hexylaluminum; dialkylaluminum chloride such as dimethylaluminum chloride, diethylaluminum chloride; alkylaluminum dichlorides such as methylaluminum dichloride, ethylaluminum dichloride; dialkylaluminum methoxide such as dimethylaluminum methoxide, diethylaluminum ethoxide, or mixtures thereof. The preferred activators for the titanium sites are trimethylaluminum, triethylaluminum, triisobutylaluminum and tri-n-hexylaluminum.

The organoaluminum compound or organoaluminum compounds in this invention may be used in the range of about 1 to 1500 moles of aluminum per one mole of transition metal in said catalyst composition, and more preferably in the range of about 50 to 800 moles of organoaluminum compound per one mole of transition metal.

The gel permeation chromatography of the polymers produced by the catalyst composition of the invention shows typical Ziegler-Natta profiles. Activities are in the range of 1 to 9 kg polymer per gram catalyst per hour under typical Ziegler-Natta conditions.

The polymers prepared by the use of the catalyst composition reported in the invention are linear homopolymers of olefins such as ethylene, or copolymers of ethylene with one or more $C_3$–$C_{10}$ alpha-olefins. Particular examples of these copolymers include ethylene/propylene copolymers, ethylene/1-butene copolymers, ethylene/1-pentene copolymers, ethylene/1-hexene copolymers, ethylene/heptene copolymers, ethylene/1-octene copolymers, ethylene/4-methyl-1-pentene copolymers. Ethylene/1-hexene and ethylene/1-butene are the most preferred copolymers polymerized with the use the catalyst composition of the present invention.

According to one embodiment, a copolymer of ethylene and carbon monoxide is used as polymeric support. The preparation of the solid catalyst component in the present invention involves drying the polymer at a low temperature under reduced pressure for a relatively short period. The polymer is then suspended in an organic solvent. Nonlimiting examples of solvents include alkanes or ethers. The polymeric material is then treated with a magnesium compound described above at a temperature in the range of about −10° to 200° C. The amount of magnesium compound to polymer support can be in the range of 0.1 mmol to 10 mmol per gram polymer. Chemcial modification of the surface of the polymer can also be used to enhance the aliphatic polyketone's properties as a support. For example, as disclosed in U.S. Pat. No. 5,955,562 aliphatic polyketones can be precisely reduced on the surface to hydroxyl groups and then subsequently reacted with a silane. The bulk properties of the polymer are claimed to be retained.

The resulting supported catalyst product is then suspended in such organic solvents including alkanes such as hexane, cyclohexane, heptane, isooctane and pentamethylheptane, or ethers such as ethylether or methyltertiarybutylether. The product material is then treated with a transition metal compound described above at a temperature in the range of about 0° to 120° C. Typical metal halides include titanium tetrachloride, vanadium tetrachloride and zirconium tetrachloride. The product is then washed with a suitable solvent such as isopentane, hexane, cyclohexane, heptane, isooctane and pentamethylheptane, preferably isopentane or hexane. The produced solid catalyst component is then washed with a suitable solvent such isopentane, hexane, cyclohexane, heptane, isooctane and pentamethylheptane, preferably isopentane or hexane, and then dried using a nitrogen purge at a temperature in the range of about 20° C. to 80° C.

The final solid catalyst component has a loading of about 0.05–8% titanium by weight. The thus-formed catalyst component is activated with suitable activators, also known as cocatalysts, for olefins polymerization. The preferred compounds for activation of the solid catalyst component are organoaluminum compounds.

Further advantages and features of the present invention will now be described in detail by way of example. The following examples are intended to be illustrative of this invention. They are, of course, not to be taken in any way limiting on the scope of this invention. Anyone skilled in the art could envision derivations of this technology too numerous to mention.

EXAMPLE 1

Preparation of Aliphatic Polyketone Support

Precatalyst A Preparation

A precatalyst was prepared by placing 0.11 g (0.48 mmol, Strem 98% purity) of $Pd(OAc)_2$, 0.22 g (0.53 mmol, Strem 98% purity) of DPPP and 0.22 g (1.16 mmol, Aldrich 98.5%) para-toluenesulfonic acid in 40 ml teflon lined LC vial. The solids were slurried in 20 ml of molecular sieve dried reagent grade acetone and 7 ml of HPLC grade acetonitrile under a nitrogen atmosphere at about 60° C. bath temperature for about 10 minutes until all of the solids had dissolve to afford a clear, bright yellow. The solvent was then removed by nitrogen purge at 30° C. The resulting solid was dark yellow with a hint of gray, presumably from partial reduction of the palladium centers during the drying step. Numerous patents teach of the preparation of this general precatalyst formulation, such as U.S. Pat. No. 4,810,774, U.S. Pat. No. 5,654,487 and U.S. Pat. No. 5,412,070.

Copolymerization of Ethylene and Carbon Monoxide by Homogeneous Precatalyst A

A copolymer of ethylene and carbon monoxide was prepared in the following manner to increase surface area and facilitate regular particle formation. The precatalyst was dissolved in HPLC grade methanol (dried over molecular sieves). The precatalyst was then injected to a 3 liter bolted enclosure autoclave containing 1 liter of methanol under 1 bar $CO/C_2H_4$ pressure at 80° C. The pressure was then immediately increased to 20 bar with a 50:50 mixture of ethylene and carbon monoxide. After 10 minutes the pressure was increased to 30 bar and 90° C. At the next ten-minute interval, the temperature was increased to 100° C. and the pressure was increased to 40 bar. Finally, the polymerization was stopped by rapidly cooling the reactor below 40° C. and venting the gases. The polymer isolated clearly showed the typical carbonyl stretching frequency for aliphatic polyketone materials at 1693 $cm^{-1}$ (U.S. Pat. No. 5,955,562) along with a broad aliphatic band observed at 3392 $cm^{-1}$. A DSC analysis of the polymer gave a melting point of 243° C. The surface area by BET was 11.3 $m^2/g$ with an estimated particle size of about 40–200 $\mu m$.

EXAMPLE 2

Synthesis of Polymer Supported Titanium Precatalyst (B)

To a two-necked round bottom flask, equipped with a condenser and stirrer, was placed 2.0 g of the aliphatic polyketone from Example 1. The flask containing the polyketone support was then heated for 30 minutes at 70° C. with agitation. The solid was then slurried in about 50 ml of n-hexane. The solid was treated with 3.0 ml of butyl magnesium grignard reagent (2.0 M in ether) for 30 minutes at 70° C. with stirring. The supernatant liquid was removed by cannula and the solid rinsed 3 times with 40 ml of n-hexane. The solid was again slurried in hexane and 3.0 ml of 1.0 M $TiCl_4$ solution was added by syringe and then treated as before. The remaining solid was dried by nitrogen purge to give a brown, free-flowing powder. (Analysis by ICP % Ti 1.20, % Mg 2.58).

EXAMPLE 3

Ethylene Homopolymerization using Precatalyst B

A two liter Zipperclave was heated to 130° C. and purged with nitrogen for 30 minutes. After cooling the autoclave to 65° C., one liter of n-hexane was introduced into the reactor. The reactor was purged twice with hydrogen and then pressurized with a total of 3 bars of hydrogen (2581 ml). About 40 liters of ethylene was delivered to achieve a total pressure of 15 bar. An injection pump was used to deliver 2.5 mmol of TEAL in hexane to the reactor. The reactor was then stirred at 200 RPM with an anchor impeller for about 20 minutes. The precatalyst B from Example 2 was slurried in about 20 ml of hexane and injected into the reactor. The polymerization was conducted for 1 hour with ethylene supplied on demand to maintain the total reactor pressure at 15 bar with approximately 212 liters ethylene consumed. A total of 244 g of HDPE was recovered with a bulk density of 0.25 g/ml. The Mw was 124000 and the $M_n$ was 34600 with a MWD of 3.58 as determined by GPC using HDPE standards. A second reaction under the similar conditions (2424 ml hydrogen added) yielded 224 g of HDPE with bulk density of 0.28 and 186 liters ethylene consumed. In this case, Mw equaled 144000, $M_n$ was 32200 and MWD was 4.40.

EXAMPLE 4

Preparation of Supported Titanium Precatalyst (C)

The preparation of Example 2 was repeated with only 1.0 mmol $TiCl_4$ added (ICP % Ti 1.32, % Mg 2.20).

EXAMPLE 5

Homopolymerization of Ethylene using the Precatalyst prepared in Example 4

The homopolymerization of ethylene was conducted as in Example 3 under the same conditions with only 60 grams of HDPE isolated and 40 liters ethylene delivered.

EXAMPLE 6

Copolymerization of Ethylene and Carbon Monoxide by Homogeneous Precatalyst (A)

The precatalyst A was prepared again and the copolymerization was carried out as before for 4 hours. The reaction produced 527 g polymer with a bulk density of 0.427. Catalyst productivity was then 2900 g PK/g Pd*hr. The activity was steady throughout the reaction without any appreciable decline.

EXAMPLE 7

Synthesis of Polymer Supported Titanium Precatalyst (D)

To a three-necked round bottom flask, equipped with a condenser, addition funnel and stirrer, was placed 4.0 g of the aliphatic polyketone from Example 6. The flask containing the polyketone support was then heated for 30 minutes at 60° C. with agitation. The solid was then slurried in about 50 ml of iso-pentane. The solid was then treated with 15.0 ml of butyl magnesium grignard reagent (2.0 M in ether from Aldrich) for 30 minutes at 40° C. with stirring. The resulting solid was then washed with n-hexane and slurried in n-hexane. The slurried material was then treated with 2 ml of neat $TiCl_4$ at 70° C. for 30 minutes and filtered. The remaining solid was dried by nitrogen purge to give a brown, free-flowing powder. (Analysis by ICP % Ti 0.83; % Mg 1.58).

EXAMPLE 8

Addition of electron donor to Polymer Supported Titanium Precatalyst (E)

To a three-necked round bottom flask, equipped with a condenser, addition funnel and stirrer, was placed 4.0 g of the aliphatic polyketone from Example 6. The flask containing the polyketone support was then heated for 30 minutes at 60° C. with agitation. The solid was then slurried in about 50 ml of iso-pentane. The solid was then treated with 5.0 ml of butyl magnesium grignard reagent (2.0 M in ether from Aldrich) for 30 minutes at 40° C. with stirring. The resulting solid was then washed with n-hexane and slurried in n-hexane. The slurried material was then treated with 10 ml of neat TiCl14 at 60° C. for 30 minutes and filtered. The solid was washed with hexane, slurried again in hexane and 1 ml of ethyl benzoate was added. The resulting material was stirred for 30 minutes at 60° C., then filtered and washed with hexane. The remaining solid was dried by nitrogen purge to give a brown, free-flowing powder. (Analysis by ICP % Ti 0.7; % Mg 2.1; % EB 3.4).

EXAMPLE 9

Addition of electron donor to Polymer Supported Titanium Precatalyst (F)

To a three-necked round bottom flask, equipped with a condenser, addition funnel and stirrer, was placed 4.0 g of the aliphatic polyketone from Example 6. The flask containing the polyketone support was then heated for 30 minutes at 60° C. with agitation. The solid was then slurried in about 50 ml of iso-pentane. The solid was then treated with 15.0 ml of butyl magnesium grignard reagent (2.0 M in ether from Aldrich) for 30 minutes at 70° C. with stirring. The resulting solid was then washed with n-hexane and slurried in n-hexane and 5 ml of ethyl benzoate was added. The resulting material was stirred for 30 minutes at 70° C., then filtered and washed with hexane. The solid was again slurried in hexane and an additional 20 ml of neat TiCl14 was added and treated as above. The remaining solid was dried by nitrogen purge to give a brown, free-flowing powder. (Analysis by ICP % Ti 3.4; % Mg 2.9; % EB 13.4).

EXAMPLE 10

Polymerization of Ethylene using Precatalyst (D)

A three liter reactor was heated under nitrogen purge at 130° C. for 30 minutes. The reactor was cooled and one liter of n-hexane was added. An injection pump was employed to introduce 15 ml of 10 M TEAL into the reactor. The reactor was purged with hydrogen and the pressure increased to a total of 3 barg using hydrogen. The reactor was then pressurized to 15 barg with ethylene at 85° C., after which 50 mg of Precatalyst D was introduced to begin the reaction. The reaction was ended after 1 hour by shutting off the ethylene supply and cooling the reactor. The yield was 441 g of polyethylene ($M_n$ 53500; $M_W$ 337000; MWD 6.3). The activity was 8800 g HDPE/g cat*hr with a bulk density of 0.27 g/cc.

EXAMPLE 10

Polymerization of Ethylene using Precatalyst (E)

A homopolymerization of ethylene at the conditions in Example 9 (except for 0.1 g catalyst injected) afforded 95 g of HDPE. The activity was 1400 g HDPE/g cat*hr.

EXAMPLE 11

Polymerization of Ethylene using Precatalyst (F)

A homopolymerization of ethylene at the conditions in Example 9 afforded 513 g of HDPE. The activity was 5200 g HDPE/g cat*hr with a bulk density of 0.27 g/cc.

The features disclosed in the foregoing description and in the claims may, both separately and in any combination thereof, be material for realizing the invention in diverse forms thereof.

What is claimed is:

1. Catalyst composition for homopolymerization or copolymerization of olefins comprising:
   (a) a solid catalyst precursor comprising a transition metal compound of group IVB, VB, or VIB of the periodic table, a magnesium compound and a support comprised of aliphatic polyketone particles; and
   (b) a cocatalyst comprising an aluminum alkyl, an aluminoxane or mixtures thereof.

2. The catalyst composition of claim 1, wherein the aliphatic polyketone particles have a mean particle diameter of about 15 µm to 500 µm, a pore volume of at least about 0.1 $cm^3/g$, a pore diameter of at least about 500 Angstrom to 10,000 Angstrom and a surface area of from about 0.2 $m^2/g$ to about 50 $m^2/g$.

3. The catalyst composition of claim 2, wherein the aliphatic polyketone particles have a molecular weight in the range of about 3,000 to about 300,000 g/mole.

4. The catalyst composition of claim 2, wherein the aliphatic polyketone particles are regularly shaped.

5. The catalyst composition of claim 1, further comprising an electron donor.

6. The catalyst composition of claim 5, wherein the electron donor comprises one or more of the group of diether carbonates, diester carbonates, alkyl carbonates, aryl chlorides and alkyl chorides.

7. The catalyst composition of claim 6, wherein the electron donor is ethylbenzoate.

8. The catalyst composition of claim 1, wherein the transition metal compound is represented by the general formula $M(OR^1)_n X_{4-n}$, wherein M represents a transition metal, $R^1$ represents an alkyl group, aryl group or cycloalkyl group having 1 to 20 carbon atoms, X represents a halogen atom and $0 \leq n \leq 4$.

9. Catalyst composition according to claim 8, wherein the transition metal is selected from the group consisting of titanium, vanadium and zirconium.

10. Catalyst composition of claim 8, wherein the magnesium compound has the general formula $R^2MgY$, or $R^3R^4Mg$, and $R^2$ is an alkyl group have 1 to 20 carbon atoms, $R^3$ and $R^4$ are different or same alkyl groups having 1 to 20 carbon atoms, and Y is a halogen atom.

11. Catalyst composition of claim 8, wherein the magnesium compound is selected from the group consisting of diethylmagnesium, dipropylmagnesium, dibutylmagnesium, di-iso-propylmagnesium, di-n-butylmagnesium, di-isobutylmagnesium, butylethylmagnesium, dihexylmagnesium, dioctylmagnesium, butyloctylmagnesium, ethylmagnesium chloride, butylmagnesium chloride, hexylmagnesium chloride and mixtures thereof.

12. Catalyst composition of claim 10, wherein the cocatalyst has the general formula $R^6{}_nAlZ_{3-n}$ or $R^7R^8Al—O—AlR^9{}_2$, wherein $R^6$, $R^7$, $R^8$ and $R^9$ each represent a hydrocarbon group having 1 to 10 carbon atoms, Z represents a halogen atom and $0 \leq n \leq 3$.

13. Catalyst composition of claim 12, wherein the cocatalyst is one or more of trimethylaluminum, triethylaluminum, triisobutylaluminum and tri-n-hexylaluminum.

14. Catalyst composition of claim 12, wherein the cocatalyst is one or more of methyl aluminoxane, ethyl aluminoxane and propyl aluminoxane.

15. Catalyst composition of claim 12, wherein the cocatalyst is one or more of trialkylaluminum and alkyl aluminoxane.

16. Catalyst composition of claim 12, wherein the ratio of aluminum to titanium atoms in the catalyst composition is about 1 to 1500.

17. A method for polymerizing olefins comprising contacting olefins with a catalyst composition which comprises:

(a) a solid catalyst precursor comprising a transition metal compound of group IVB, VB, or VIB of the periodic table, a magnesium compound and a support comprised of aliphatic polyketone particles; and (b) a cocatalyst comprising an aluminum alkyl, an aluminoxane or mixtures thereof.

18. A method of claim 17, wherein the olefin polymerization comprises homopolymerization of olefins or copolymerization of olefins with alpha-olefins.

19. The method of claim 18, wherein the aiphatic polyketone particles have a mean particle diameter of about 15 $\mu$m to 500 $\mu$m, a pore volume of at least about 0.1 cm$^3$/g, a pore diameter of at least about 500 Angstrom to 10,000 Angstrom, a surface area of from about 0.2 m$^2$/g to about 50 m$^2$/g, and a molecular weight in the range of about 3,600 g/mole to about 300,000 g/mole.

20. The method of claim 19, wherein said catalyst composition further comprises at least one electron donor selected from the group of diether carbonates, diester carbonates, alkyl carbonates, aryl chlorides and alkyl chorides, said transition metal compound is represented by the general formula $M(OR^1)_nX_{4-n}$, wherein M represents the transition metal, $R^1$ represents an alkyl group, aryl group or cycloalkyl group having 1 to 20 carbon atoms, X represents a halogen atom and $0 \leq n \leq 4$.

* * * * *